July 30, 1963 F. KLUMPP, JR., ETAL 3,099,046
MOLD FOR SNAP-IN BUSHING
Original Filed Nov. 13, 1959 4 Sheets-Sheet 1

INVENTORS
Ferdinand Klumpp, JR
William H. Jemison
BY

July 30, 1963   F. KLUMPP, JR., ETAL   3,099,046
MOLD FOR SNAP-IN BUSHING
Original Filed Nov. 13, 1959   4 Sheets-Sheet 3

INVENTORS
Ferdinand Klumpp, Jr.
William H. Jemison
BY

United States Patent Office 3,099,046
Patented July 30, 1963

3,099,046
MOLD FOR SNAP-IN BUSHING
Ferdinand Klumpp, Jr., Union, and William H. Jemison, Berkeley Heights, N.J., assignors to Heyman Manufacturing Company, Kenilworth, N.J., a corporation of New Jersey
Original application Nov. 13, 1959, Ser. No. 852,689, now Patent No. 3,001,007, dated Sept. 19, 1961. Divided and this application Dec. 31, 1959, Ser. No. 863,370
11 Claims. (Cl. 18—42)

Our invention relates to improvements in molds and more particularly to a novel design for a straight mold for injection-molding, out of a suitable plastic or other equivalent material, of insulating bushings of the snap-in or self-locking type.

Patentable subject matter disclosed and claimed herein is that divided from our parent application Serial No. 852,689, filed November 13, 1959, and issued Sept. 19, 1961 as Patent No. 3,001,007; the latter being directed to novel structural and operational features of a snap-in bushing in the same general class as that disclosed in Patent No. 2,424,757 issued July 29, 1947 to Ferdinand Klumpp, Jr. Reference might also be made to the respective bushing or grommet designs disclosed in Patents Nos. 2,420,826; 2,424,756; 2,424,758; 2,664,458; 2,668,-316; 2,724,736; and 2,799,528. A bushing of this type is used extensively for assembly with a sheet-metal panel or plate out of which a hole has been punched. A preferred form such as that disclosed in the aforesaid Patent No. 2,424,757 and having the usual flanged head, is inserted into the hole and pushed through to the point whereat the head is firm against the adjacent side or face of the plate. During this action two or more protruding fingers or equivalent parts or structure functional in the manner of a doorlatch, are pushed or forced inwardly by their camlike engagement with the circular edge of the hole. At the point whereat the head is firm against the adjacent face of the plate the fingers or other parts become free to move outwardly with a snap action, thus to hold the bushing locked in place. In many of the bushing or grommet designs proposed heretofore, some of which are disclosed in the above patents, there are required to be one or more undercuts, thus to make necessary in each case employment of a "split" mold with its inherent disadvantages of being relatively complicated, expensive, and capable only of a rate of product-output substantially less than would be the case were it possible to use a straight mold and to employ automatic operation, using the method or system referred to as injection molding. The novel structural and operational features of the two-part, straight mold disclosed and claimed herein are closely related to those of the improved snap-in bushing disclosed in our aforesaid Patent No. 3,001,007, in the sense that such novel features of the mold give to it extreme simplicity as compared to a split mold for the same purpose; and compatibility for use in a conventional, automatic, injection-molding machine while at the same time and when the mold is closed giving to the same the mold cavity required to mold our aforesaid snap-in bushing with all of its structural and operational features and advantages although there are undercuts in the longitudinal, cross-sectional configuration of this bushing.

The important aspect of our invention resides in the provision of a mold which is a two-part, straight mold well suited for use in a conventional type of automatic injection-molding machine while at the same time having its cavity and core parts so correlated and shaped that when the mold is closed there is provided the mold cavity required to mold the improved snap-in bushing disclosed and claimed in our aforesaid Patent No. 3,001,007; although in the latter there are undercuts.

Another object of our invention resides in the provision of a relatively simple, relatively inexpensive, two-part, straight mold of the character referred to which, when closed, provides the required cavity for injection-molding of a flanged, snap-in bushing having all the advantages of ease of assembly with a chassis or other plate out of which a hole has been punched; of providing for complete insulation around the hole; of the flanged head of the bushing being functional to cause the same to hold itself locked tightly to the plate and always firmly and correctly centered in the hole thus to avoid malfunction such as rattling; of being functional to keep itself firmly locked against dislodgment after once being inserted or assembled; of being relatively easy to manufacture; of requiring a relatively small amount of material thus to allow for lower consumer price; of being functional to accommodate different thicknesses of chassis plate; and of being, simultaneously with the performance of its insulating function, capable of firmly holding together two or more plates, face-to-face.

Other objects and advantages will hereinafter appear.

There are disclosed in the drawings both a simplified form of straight mold embodying our invention as claimed herein, and a form of snap-in bushing molded by the former and embodying the important and novel features of structure and operation characteristic of the bushing disclosed in our aforesaid Patent No. 3,001,007.

The details of structure and operation of standard frames and other parts of a conventional type of automatic molding machine in which our improved mold might be installed, are well known to those skilled in the art. With regard to these, reference is made to the prior art and to related publications such as the book by J. H. Du Bois and W. I. Pribble, entitled "Plastics Mold Engineering" and published 1946 by American Technical Society, Chicago, U.S.A., and the book by John Delmonte, entitled "Plastics Molding" and published 1952 by John Wiley & Sons, Inc., New York City, U.S.A.

The respective physical characteristics such as tensile strength, elongation, and flexural modulus of portions or parts of our improved bushing as well as those of the bushing considered as a whole, are important attributes which when taken with likewise important dimensional relations result in the better performance over comparable bushings of the prior art. Some latitude on choice of material and dimensional relations for the bushing will be apparent. A material found to be particularly satisfactory and for which our novel mold is particularly adaptable in the way of its being capable of functioning under the working temperatures and pressures required for the material, is the plastic identified in the trade as "DuPont Nylon Resin Zytel 101"; the tensile strength of which, at 73° Fahrenheit, equals approximately 11,800 pounds per square inch, the elongation of which, at 73° Fahrenheit (2½% water), is substantially 300%, and the flexural modulus of which, at 73° Fahrenheit (2½% water), is substantially 175,000 pounds per square inch. With regard to any terms hereinafter used, such as those expressive of particular values or degrees of resiliency or springiness, flexibility, etc.; it is to be understood that these are not critical and are considered to be anywhere within a substantial range such as that within which come the aforesaid values of "Zytel 101."

Figure 1:
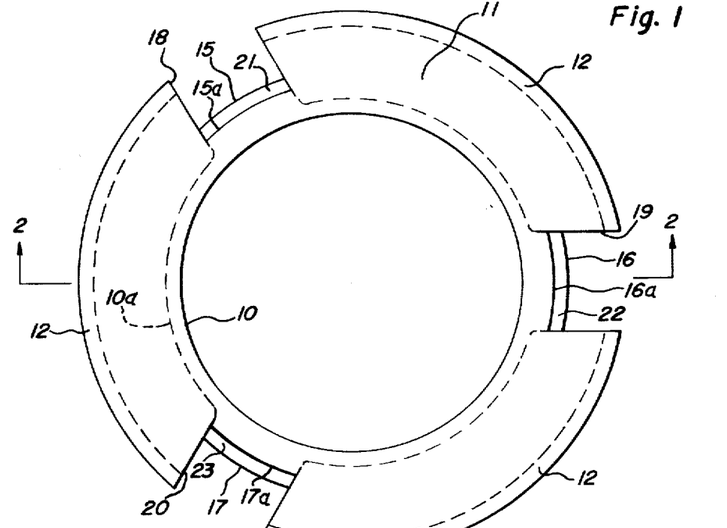
FIG. 1 is an enlarged, plan view of the snap-in bushing for the injection-molding of which our novel mold was designed.
Figures 2, 3, 3A, 3B:
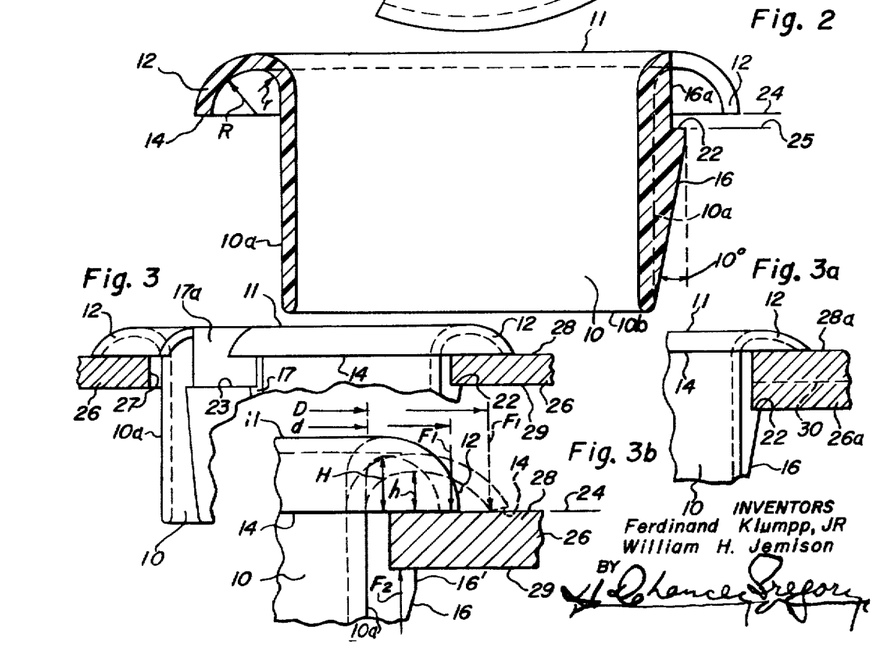
FIG. 2 is a sectional view, the section being taken on the line 2—2 in FIG. 1.
FIG. 3 is an elevational view of our improved bushing, on a reduced scale from and looking upwardly in FIG. 1 and showing the bushing assembled to a panel or other plate, the latter being shown in section on a line such as would correspond to line 2—2 in FIG. 1.
FIG. 3a is illustrative of the range of adaptability of the bushing for different thicknesses of plate, and is a fragmentary view taken from FIG. 3.
FIG. 3b is an enlarged, fragmentary view taken from FIG. 3 and is explanatory of the significance of relations of one dimension to another in our improved bushing.

In FIGS. 1 and 2 there is shown a form of insulating bushing embodying the invention as claimed in our aforesaid Patent No. 3,001,007 and for the injection-molding of which, by automatic machinery, there is required a form of mold such as the one disclosed and claimed herein. The bushing comprises a relatively flexible, non-split, cylindrical body portion 10, the latter being hollow end-to-end thereof and provided at one of its ends with a head 11 having a relatively high degree of springiness and an arcuate cross-sectional configuration embracing substantially 180°, as shown in FIG. 2. The circular edge of head 11 is in the form of an arcuate flange 12 the peripheral surfaces 14 of which are relatively flat and disposed or arranged to face the adjacent side or face of the plate aforesaid.

Reference numerals 15, 16 and 17 respectively designate three ribs spaced 120° from each other in the direction circumferentially of body portion 10, each rib being raised from the outside cylindrical surface 10a of body portion 10, and each rib extending longitudinally of the latter from the end 10b thereof to head 11.

As shown in FIG. 1 and for the purpose hereinafter explained, head 11 and its flange 12 are provided through the same with U-shape notches 18, 19 and 20 each radially disposed with respect to the longitudinal axis of body portion 10 and each extending to the circular edge of head 11, i.e., to the peripheral surfaces 14 of flange 12. As shown also in FIG. 1, the notches 18, 19 and 20 are aligned respectively with ribs 15, 16 and 17.

Ribs 15, 16 and 17 are stepped, as more clearly shown at the right in FIG. 2, to provide the same respectively with locking surfaces or steps 21, 22 and 23 which protrude radially outwardly from the outside surface 10a of body portion 10 and are disposed in opposition with respect to surfaces 14 in the sense that these opposed surfaces are disposed for engagement respectively with the opposite sides or faces of the aforesaid plate, at the hole through the latter.

The plate-engaging surfaces 14 are disposed in a plane designated at 24, and the plate-engaging surfaces 21, 22 and 23 are disposed in a plane designated at 25, each of these planes being perpendicular to the longitudinal axis of body portion 10 and, for the reason or purpose hereinafter explained, being spaced one from the other a distance less than the thickness of the plate, at the hole through the latter.

For the purpose of keeping the bushing centered in the hole, after assembly, the respective surface parts 15a, 16a and 17a of the outside surfaces of ribs 15, 16 and 17 and which are, respectively, between plate-engaging surfaces or locking steps 21, 22 and 23 and the head 11; are disposed in a cylinder the axis of which is coincident with the axis of the outside cylindrical surface 10a of body portion 10, the diameter of this cylinder being substantially the same as the diameter of the hole into which the bushing has been inserted.

In assembling the bushing with a panel plate, wall or other structure 26 through which a hole 27 has been punched or otherwise provided, it is first inserted into the hole, generally from the outside or front face 28 of the panel. By thumb or a suitable tool, sufficient force is then applied to head 11 to push body portion 10 all the way through, after which the thumb or tool is disengaged to permit the bushing to assume the final position shown in FIG. 3.

Important to note is the structural behavior of the relatively flexible body portion 10 as the bushing reaches and passes through the initial stage in its assembly with a panel plate. The high ends of ribs 15, 16 and 17 respectively at steps 21, 22 and 23, being normally on a circumference substantially greater than the hole diameter, are engaged quite firmly with the edge of the hole, thus to distort body portion 10. The normal diameter of the outside cylindrical surface 10a is such that in this position the three outside surface areas, designated at 15a, 16a and 17a lightly engage the edge of the hole 27, the intervening surfaces being clear of the edge of the hole, as shown by the lines 10a and 27, in FIG. 3.

With the bushing pushed "home" the relatively flexible head 11 which also has a relatively high degree of springiness, is fully sprung to be substantially flat against the adjacent face 28 of plate 26. The surfaces or steps 21, 22 and 23 now are well beyond and spaced from the under or far side 29 of plate 26. The bushing-centering surfaces 15a, 16a and 17a, being on a cylindrical surface whose diameter is about equal to that of hole 27, now engages the edge of the hole relatively lightly. The relatively flexible body portion 10 which has a degree of springiness, having thus been released from the "squeeze" previously causing the distortion referred to above, now will have assumed its normal, cylindrical shape as shown by dash line 10a in FIG. 1. This restoration of body shape takes place instantly and in a springlike manner as the respective outside edges of the locking surfaces or steps 21, 22 and 23 clear the relatively sharp edge of hole 27 and ribs 15, 16 and 17 spring radially outwardly with a snap action, in the manner of the conventional door-latch. It is this snap action, and the basic characteristics of material and structural features herein to cause the same, which is meant by the term "snap-in" when reference is made to our improved bushing as being a "snap-in" bushing.

After the above "snap-in" action, the thumb or tool is disengaged to remove the force previously applied against head 11, thus to permit the flattened head to spring back to substantially it normal shape as shown in FIG. 2, but not quite to this extent because of the planes 24 and 25 being spaced, as aforesaid, a distance less than the thickness of the chassis or panel plate 26. This expedient, taken with the relatively strong spring action and the shape and dimensions of head 11, provides for substantial thrust of surfaces 14 against the adjacent side or face 28 of plate 26; such thrust being balanced by the equal and oppositely-directed thrust of surfaces or steps 21, 22 and 23 against the other side 29 of plate 26.

It will be seen from the foregoing that with the bushing assembled as in FIG. 3, it is securely locked to the plate and cannot come out, and that on account of the engagement of surfaces 15a, 16a and 17a with the edge of hole 27, the bushing is held centered in the hole and firmly so, with the outside surface 10a of body portion 10 spaced from or clear of the edge of the hole, as shown at the left in FIG. 3.

The same size bushing, i.e., one designed or dimensioned for a hole of a given diameter, can adapt itself to and can accommodate plates of substantially different thicknesses. This advantage is illustrated in FIG. 3a wherein the thickness of plate 26a is shown to be substantially greater than that of plate 26. The action in assembly is identical to that in FIG. 3, except that due to the greater thickness of plate 26a the head 11, as illustrated in FIG. 3a, remains sprung to a slightly greater extent than is the case in FIG. 3, and the grip or hold on the plate is proportionately greater, as will be well understood. This operational action suggests an added advantage which resides in the fact that the greater thickness might be because of two or more plates being held together, face-to-face, as represented by the dash line 30 in FIG. 3a. Thus, our improved bushing can function in the manner of a rivet to hold two or more plates together, face-to-face, and firmly so. For some uses or applications it might be required that after assembly there is permissible some rotary movement of either plate in its own plane and relatively with respect to the other plate or plates. Our improved bushing permits this, which in some cases might be important for adjustment of the plates to facilitate the carrying out of a subsequent assembly or mass-production step.

Without the provision of any notches in head 11, such as the notches 18, 19 and 20, our improved bushing would, to an extent satisfactory for some applications, still be functional in the manner and for the purposes explained, while still having embodied therein one or more aspects of our invention as claimed herein. Use of the notches has a bearing upon material used and the dimensions and cross-sectional U-configuration of head 11, i.e., the latter giving high resistance against bending or crosswise distortion, as in the case of the conventional U-beam for structures. The three notches shown divide head 11 and its flange 12 into three equal segments, each embracing less than 120°. During the initial stage of assembly explained above the notched head and flange, therefore, offer no appreciable resistance to the necessary distortion of body portion 10. Furthermore, each of the three, structurally-independent segments flattens or fans out more easily than would otherwise be the case. Still further, use of the notches and their disposition to be in alignment, respectively, with ribs 15, 16 and 17, make possible the use of a straight mold for automatic operation in manufacture by injection molding.

Figures 1A, 1B, 4, 4A, 5, 6:
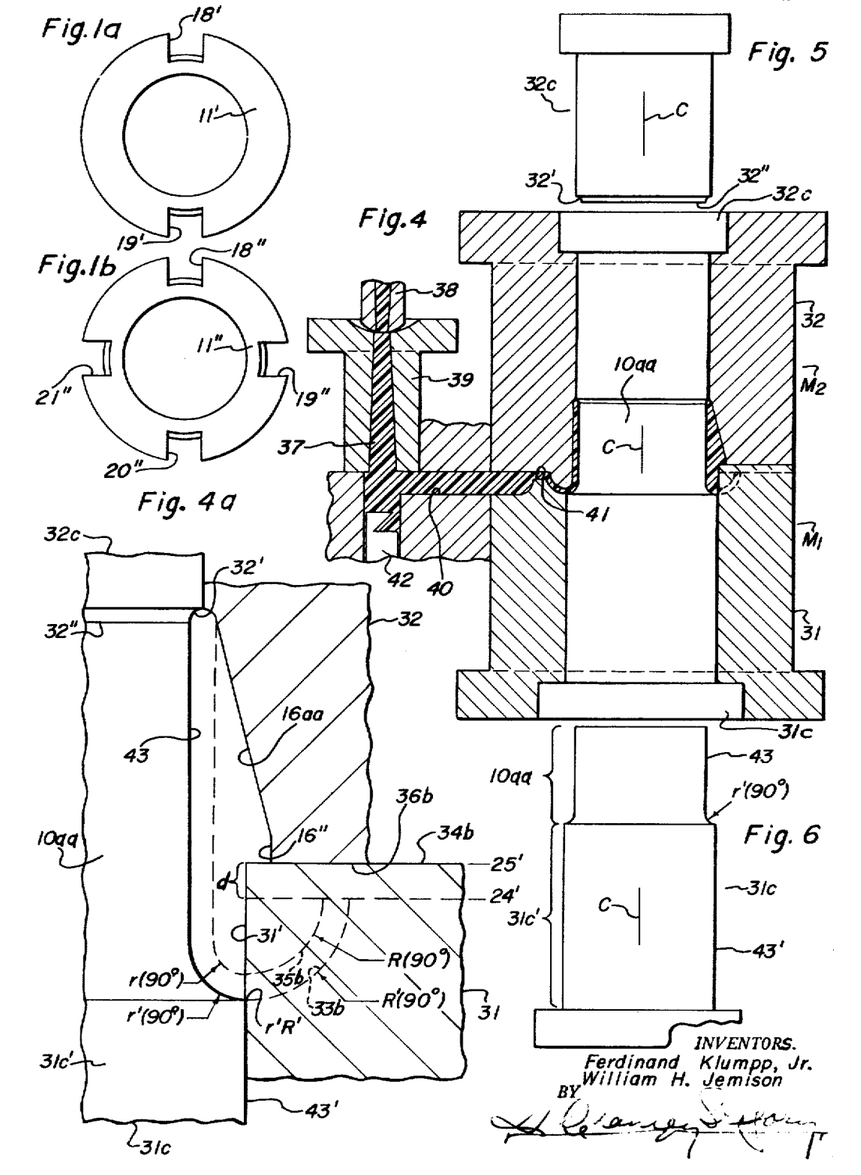
FIG. 4 is a view partly in elevation and partly in vertical section centrally through our novel mold and the associated nozzle, sprue bushing, sprue puller, runner, and gate; the mold being shown in the closed position thereof with the plastic or equivalent material having been released for a "shot" to fill the mold cavity.
FIG. 4a is a fragmentary view taken from the right-hand central area of FIG. 4, the scale being about four times that in FIG. 4 and the plastic or other material not being shown, thus to illustrate more clearly the manner in which the respective work faces or surfaces of the cavity parts and core parts of our improved mold fit together to form or to provide the mold cavity.
FIGS. 5 and 6 are elevational views of the top and bottom cores, respectively, of the mold.
FIGS. 1a and 1b are plan views illustrative of modifications, each being on a reduced scale and similar to FIG. 1.

The structural and operational features in FIGS. 1a and 1b are identical to those in FIGS. 1, 2, 3, 3a and 3b, exceptions being that in FIG. 1a there are the two notches 18' and 19' disposed diametrically-opposite to each other, in head 11' of the two-notch bushing and in FIG. 1b there are the four notches 18", 19", 20" and 21" in head 11" of the four-notch bushing, each notch being spaced 90° from the notch to either side of the same.

It will be seen that by reason of the novel structural features of the mold disclosed herein, it provides the mold cavity for molding the aforesaid bushing so that the latter provides for complete insulation around the hole 27 on account of being a "non-split" bushing. In other words, the body portion 10 and head 11 are solid or continuous throughout 360°, as viewed in FIG. 1. Also, these features of mold structure give to the bushing the advantages of structure and operation, as follows.

The ribs 15, 16 and 17, as indicated in FIG. 2, have a ten-degree taper in the direction toward the end 10b of body portion 10, thus to facilitate entrance of the bushing into hole 27. The three outside cam surfaces thus provide considerable leverage or force-multiplication as in the use of a wedge, and minimize extent of effort necessary to force or to push the bushing all the way through hole 27. The high parts of these cam surfaces immediately adjacent to the locking or latch surfaces or step 21, 22 and 23, such as the high part 16' shown more clearly in FIG. 3b might be on the surface of a cylinder whose axis is parallel to or coincident with that of the bushing, thus to give substantial area of engagement or contact with the edge of hole 27 at the time when the pressure is greatest because of the greatest distortion of and the greatest stress in body portion 10 when the latter is about half-way through hole 27 during assembly of the bushing.

With regard to satisfactory dimensions and some relations of one dimension to another, for the mold, those for molding a half-inch bushing, for example, can be taken or derived from the latter, there being, however, the well understood differences such as the radius of curvature for a convex surface of the mold being the radius of curvature for the corresponding but concave surface of the bushing, usual account being taken for tolerances and allowances, such as shrinkage tolerance and draft allowance. The dimensions in inches and some relations of one dimension to another for a half-inch bushing and from which the corresponding dimensions and relations of one dimension to another can be taken or derived, for the mold; are, approximately, as follows. The inside and outside diameters of body portion 10 to be, respectively, .425 and .461; the edge of flange 12 to be on a circle whose diameter is .677; the width of each notch to be .125; the length or longitudinal extent of the bushing to be .328; the distance between planes 24 and 25 to be .020; the surfaces 15a, 16a and 17a to be on a cylinder whose diameter is .500; the taper of ribs 15, 16 and 17 to be 10°; the radius R of curvature of the 90° extent of the arcuate cross-sectional configuration of head 11 from the outside edge of flange 12 to the wall of body portion 10 to be .060; and the radius r of curvature of such configuration immediately adjacent to the 90° arc to be .030.

FIG. 3b is more clearly illustrative of the better operating action possible and the advantages generally in the use of our improved bushing as compared with some of the bushing or grommet designs proposed heretofore, all of which is made possible by the novel structural features of the mold disclosed and claimed herein. Such better operating action and advantages can be attributed to the joint effects or results of dimensions or relation of dimensions one to the other and to the aforesaid characteristics of flexibility and springiness of the material of which the bushing is made. For example, with the bushing assembled with chasis or panel plate 26 of usual thickness and head 11 and its flange 12 in the full-line position shown, the total downwardly-directed force $F_1$ represented by the full-line arrow equals the total upwardly-directed force represented by the arrow $F_2$, and the span or spread of head 11 and its flange 12 is in amount the distance d of the center of area of locking surface 1 radially outwardly from the outside surface 10a of body portion 10. The lesser radius r indicated in FIG. 2 provides a degree of springiness substantially greater than would otherwise be the case, thus to hold the head 11 and its flange 12 substantially as shown, with surfaces 14 substantially flush or flat against the top surface 28 of plate 26.

With the bushing assembled with chassis or panel plate 26a of thickness greater than usual, as shown in FIG. 3a, and with head 11 and its flange 12 accordingly in the dash-line position shown in FIG. 3b, the total downwardly-directed force represented by the dash-line arrow will be the same as before but the distance d will have increased to the distance D. Although surfaces 14 now are not as flush or as flat against the top surface 28 of plate 26, the lesser radius $r$ provides the greater degree of tension necessary to maintain force $F_1$ equal to the oppositely-directed force $F_2$.

In the use of a given size of our improved bushing with plate of different thickness it occurs that each of the ratios D to $d$ and H to $h$ can vary over a substantial range, the action being such that with the same size bushing assembled with plates substantially different in thickness, the ratio of D to $d$ is at least 4 to 3 and the ratio of H to $h$ is at least 7 to 4. Considered from another viewpoint, it will be seen that the extent of difference of plate thickness which there can be for any one size of our improved bushings to be functional; is the extent of maximum height H of the inside surface of head 11 from the plane 24 of locking surfaces 14. As shown in FIG. 3$b$, with distance $d$ increased to the distance D, the previous height H will have decreased to the height $h$. The range or extent of plate thickness possible for a given size bushing is determined by the possible difference between H and $h$; it being noted that when plate thickness is about equal to the maximum height H, the head 11 and its flange 12 are spread or fanned out substantially flat. In such case, $h$ is zero and D is maximum. Throughout the full range or flexure of head 11 and its flange 12, i.e., from the full-line position shown in FIG. 3$b$ whereat $d$ is about the same as in FIG. 2 to the extreme position whereat $h$ is zero; the lesser radius $r$ provides that there is always sufficient springiness and tension at the juncture of head 11 with the wall of body portion 10 to carry the load, the latter in any case being the torque or moment equal to $F_1$ multiplied by the span or lever arm such as D or $d$.

The choice of number of notches such as the three shown in FIG. 1, the two shown in FIG. 1$a$, and the four shown in FIG. 1$b$; is an expedient for control of the extent or magnitude of force $F_1$ and the corresponding amount of permissible stress in the area of radius $r$. It will be understood that other factors to be considered and which are jointly contributive for the best operating action with a particular gauge or thickness of plate 26 or comparable structure; are respective values of $r$, $d$, the thickness of head 11 and flange 12 thereof, and the aforesaid physical characteristics of the material of which the bushing is made.

Reference is now made particularly to the upper right-hand portion of FIG. 2. In any one of the embodiments of our invention disclosed herein and in which head 11 is provided with one or more ribs such as the two ribs and the two notches 18′ and 19′ aligned respectively with the latter as in FIG. 1$a$, the three ribs 15, 16 and 17 and the three notches 18, 19 and 20 aligned respectively with the latter as in FIG. 1, and the four ribs and the four notches 18″, 19″, 20″ and 21″ aligned respectively with the latter as in FIG. 1$b$; there is, at that end of each rib adjacent to head 11, the distinctive L-shaped shown more clearly in FIG. 2. In the case of rib 16 and notch 19 aligned with the same, the surface portion 16$a$ forms the vertical and longer leg of the L and the locking surface 22 perpendicular to surface portion 16$a$ forms the shorter leg of the L. In other words, that portion of the outside surface of the bushing from the outside surface of head 11 and thence longitudinally of the bushing to and including the second locking surface 22, is L-shape. To cause this, when the mold is closed as shown in FIGS. 4 and 4$a$ the corresponding areas of the mold-cavity surface are L-shaped because of the respective, distinctive, cross-sectional configurations of the mold parts $M_1$ and $M_2$ and to which some of the claims herein are particularly directed.

Reference is now made to FIGS. 4 and 4$a$ showing a form of straight, injection mold embodying our invention as claimed herein and adapted particularly for use in a conventional type of injection-molding machine which performs all operations automatically and in the desired sequence, this mold being that required for molding the bushing shown in FIGS. 1 and 2.

The mold comprises a first mold part designated generally by the reference character $M_1$, and a second mold part designated generally by the reference character $M_2$. Mold part $M_1$ consists of a cavity or cavity part 31 provided with a core 31$c$. Mold part $M_2$ consists of a cavity or cavity part 32 provided with a core 32$c$. In FIG. 4 core 31$c$ is shown fully inserted into the associated cavity part 31, and core 32$c$ is shown fully inserted into the associated cavity part 32. Either or both of the cores 31$c$ and 32$c$ might be made integral with the respective cavity parts 31 and 32.

The mold considered as a whole and/or each of the individual parts thereof disclosed in FIGS. 5, 6, 8 and 11, are that embodiment of our invention for the molding of the bushing wherein there are the three notches 18, 19 and 20 each spaced 120° from the notch to either side of the same. With the mold closed as shown in FIGS. 4 and 4$a$, the two mold parts $M_1$ and $M_2$ thereof form or provide the required mold cavity for this bushing.

The work face of cavity part 31 is provided with the three concave edge portions 33$a$, 33$b$ and 33$c$, each disposed circumferentially about the longitudinal axis C of cavity part 31. These edge portions have a ninety-degree, arcuate cross-sectional configuration on the radius R′ which is R plus the thickness of head 11 and its flange 12, and provide respectively the convex surfaces of the three segments of head 11 and its flange 12.

Figures 7, 9:
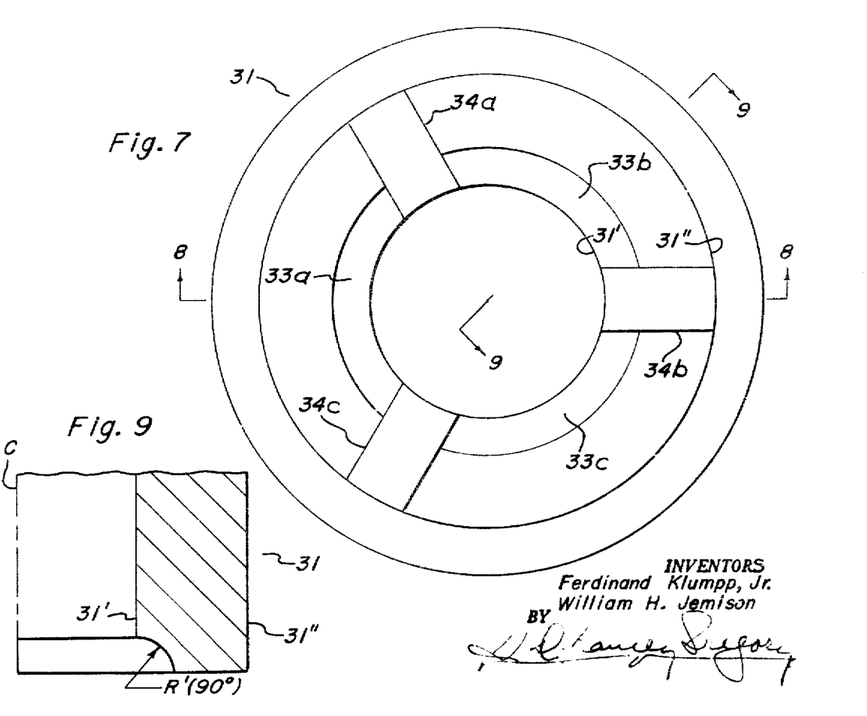
FIG. 7 is a top plan view of the bottom cavity in FIG. 4.
FIG. 9 is a fragmentary, sectional view, the section being taken on line 9—9 in FIG. 7.
Figure 8:
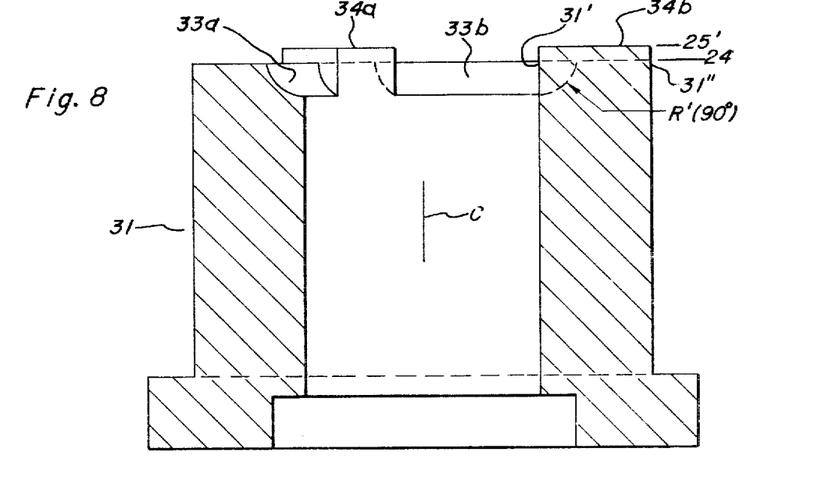
FIG. 8 is a sectional view taken on line 8—8 in FIG. 7.
Figures 10, 12:
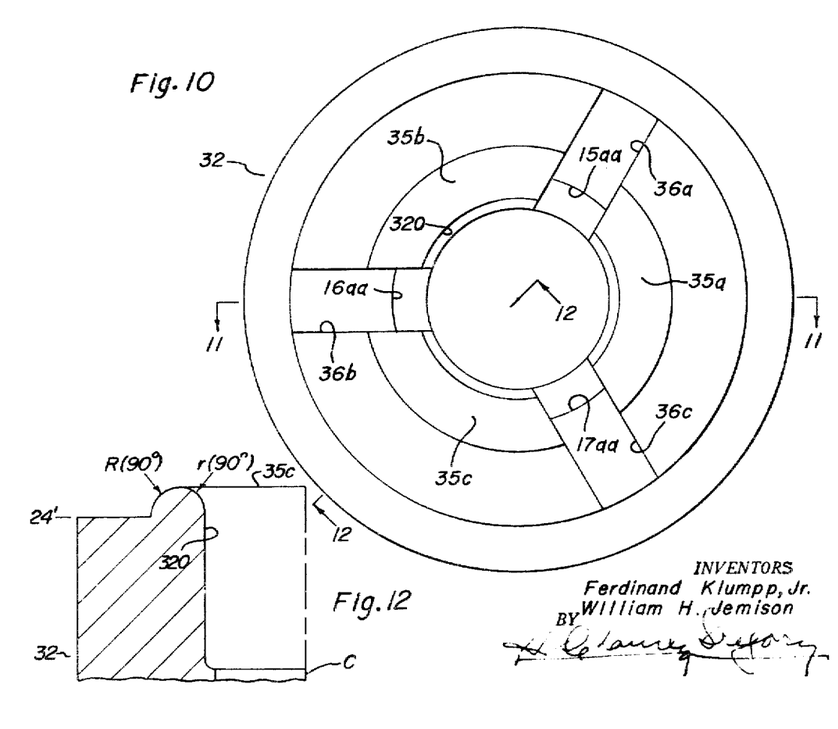
FIG. 10 is a bottom plan view of the top cavity in FIG. 4.
FIG. 12 is a fragmentary, sectional view, the section being taken on line 12—12 in FIG. 10.
Figure 11:
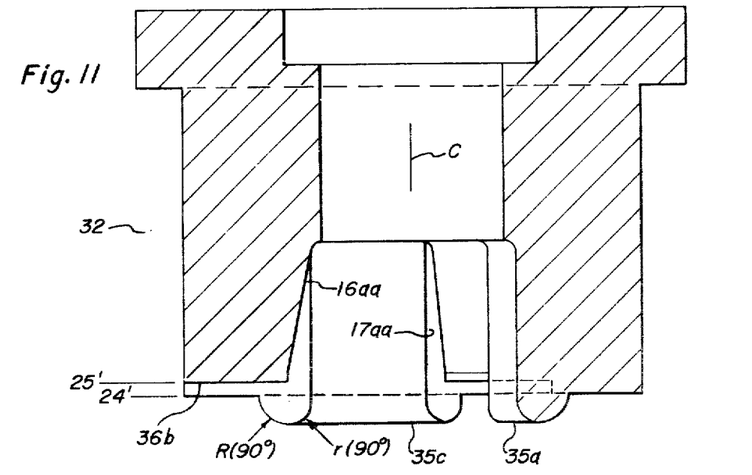
FIG. 11 is a sectional view taken on line 11—11 in FIG. 10.

For the purpose of forming or making the notches 18, 19 and 20, the work face of cavity part 31 is also provided with the three circumferentially-spaced projections or protrusions 34$a$, 34$b$ and 34$c$, each of the latter having a rectangular cross-sectional configuration as more clearly shown in FIG. 8, each being radial with respect to the longitudinal axis C of cavity part 31 and, as shown in FIG. 7 and in the upper righthand portion of FIG. 8, each being in extent the full distance across the work face of cavity part 31, i.e., the radial distance from the inside cylindrical surface 31′ of cavity part 31 to the outside cylindrical surface 31″ of the latter.

It is to be noted that the extent, circumferentially with respect to the longitudinal axis C of cavity part 31, of any one of the concave edge portions or surfaces such as surface 33$a$, is the same as that between the respective adjacent faces or sides of the two related projections or protrusions such as the projections 34$a$ and 34$c$ at opposite ends of surface 33$a$.

The reference numerals 24′ and 25′ in FIGS. 4$a$ and 8 designate planes corresponding, respectively, to the planes 24 and 25 in FIG. 2.

The workface of cavity part 32 is provided with the three projections or protrusions 35$a$, 35$b$ and 35$c$, each disposed circumferentially about the longitudinal axis C of cavity part 32. These projections or protrusions have an arcuate, convex, cross-sectional configuration on the radii R and $r$ in FIG. 2 and each through ninety degrees as indicated in FIGS. 4$a$, 11 and 12; and provide respectively the concave surfaces of the three segments of head 11 and its flange 12.

The workface of cavity part 32 is also provided with the three circumferentially-spaced slots 36$a$, 36$b$ and 36$c$, these being disposed and dimensioned similarly to the projections or protrusions 34$a$, 34$b$ and 34$c$ and, when the mold is closed as shown in FIGS. 4 and 4$a$, receiving the latter with a relatively close fit to provide for the three notches 18, 19 and 20. Each of the three slots 36$a$, 36$b$ and 36$c$ extends from the inside surface 320 of cavity part 32 radially outwardly with respect to the longitudinal axis C of the latter, each of these slots being spaced substantially one hundred twenty degrees from the slot to either side of the same. As shown more clearly in FIG. 4$a$, the adjacent mating surfaces of core 31$c$ and cavity part 32 are formed or shaped to provide for the three ribs 15, 16 and 17 aligned respectively with notches 18, 19 and 20 and each having the cross-sectional configuration shown to the right in FIG. 2, thus to give the 10° taper and to form the respective steps or locking surfaces or steps 21, 22 and 23 and the surface parts 15a, 16a and 17a. For this purpose, in the work surface of cavity part 32 there are the three longitudinally-disposed grooves 15aa, 16aa, and 17aa aligned with and joining respectively the slots 36a, 36b and 36c, the depth of each groove being tapered along substantially its entire length, i.e., except in the area 16″ to provide for the high part 16′ of rib 16, for example, and except for the substantially ninety-degree concave surface shown at the top end in FIG. 4a and which mates with the ninety-degree concave surface 32′ to form the rounded end 10b of the bushing. As shown more clearly in FIG. 12, at least a substantial circumferential extent of the work surface about the longitudinal axis C is convex through one hundred eight degrees and has a uniform cross-sectional configuration on the radius or arc r through ninety degrees from the inside cylindrical surface 320 and on the radius or arc R substantially greater than r through the other 90°.

In operation; after the mold part $M_1$ is closed on or clamped against the mold part $M_2$, the correct amount of the plastic material 37, at the required temperature and pressure, is "shot" from nozzle 38 of the heating cylinder (not shown) and is injected into the sprue bushing 39 and through the runner 40 and gate 41, into the mold cavity. Following the curing cycle which is of short duration, and just before automatic movement of mold part $M_1$ to open the mold, the sprue puller 42 functions automatically to remove the sprue up to gate 41 and to withdraw the resin string which forms at the nozzle orifice. Knockout or ejector pins (not shown) then function to push the molded piece clear of cavity part 31 and core 31c. It is proposed to make use of bottom knockout pins. These are, accordingly, to be associated with the bottom mold part $M_1$, there to be employed three knockout pins located or disposed so that they will push, respectively, against ribs 15, 16 and 17, thus to eliminate distortion of the molded piece incidental to ejection of the same.

Several factors or features of design insure that as the mold is opened, the molded piece holds to the ejector half $M_1$. One of these resides in putting the runner 41 in the workface of cavity part 31. Another resides in the joint effects of a relatively slight taper or draft being given to the workface of cavity part 32 and of a lesser degree of taper or draft being given to the workface 43 of core 31c, plus the condition of the core surface 43 being equal in length to the length or height of the bushing, thus to result in maximum area of contact or grip of the core surface 43 with the inside surface of the molded piece, as shown in FIG. 4. In this connection it is to be noted that with the mold closed the respective adjacent faces of cores 31c and 32c engage at the end 10b of the molded piece; the circular, concave surface 32′ around the edge of the workface 32″ of core 32c forming, with the complementary concave surface in cavity part 32, the 180° or semi-circular cross-sectional configuration of the edge or end 10b of the molded piece.

One advantage of locating gate 41 at the edge of flange 12 of the molded piece is that there is no flash to remove at this area.

As shown in FIGS. 4 and 4a, with our improved mold closed there is, between the engaged workfaces of cavity parts 31 and 32, a straight parting line, i.e., in planes 24′ and 25′ which correspond, respectively, to the planes 24 and 25 of surfaces 14, 21, 22 and 23 of the molded piece.

The several advantages or features of design pointed out above contribute to a substantial saving in cost of manufacture because the bushings molded by the mold disclosed and claimed herein will tumble clean if this step should be at all necessary.

In FIGS. 4 and 4a and in the above description the longitudinal axis C of the mold has been considered vertical for convenience of reference, i.e., to identify $M_1$ as the bottom mold part and $M_2$ as the top mold part, and to state that in opening the mold the part $M_2$ is raised or the part $M_1$ is lowered. However, with our improved mold installed in a preferred type of automatic injection-molding machine, the longitudinal axis C of the mold will be horizontally disposed so that in closing and opening the mold either of the two parts $M_1$ and $M_2$ will be moved horizontalwise with respect to the other part. A multiple-cavity mold may be made with individual cavity parts to permit easy replacement in case of damage to any one cavity part.

Should there occur wear, breakage, or other fault in only one of the cavity parts 31 and 32 or in only one of the cores 31c and 32c, the defective one of these four pieces can be replaced and the other three retained for continued use. In this regard, our invention resides not only in the complete mold as shown in FIGS. 4 and 4a, but also in the separate or individual parts or portions thereof, such as the cavity part 31 shown in FIGS. 7, 8 and 9; the cavity part 32 shown in FIGS. 10, 11 and 12; the core 31c shown in FIGS. 4a and 6; and the core 32c shown in FIGS. 4a and 5.

The novel structural features of core 31c are useful in a mold for molding bushings having in and through the edge portion 12 of its head three notches as in FIG. 1, two notches as in FIG. 1a, four notches as in FIG. 1b, or no notches, i.e., in the latter case the head 11 and its flange 12 being continuous or unbroken throughout the entire 360° of their circumferential extent. As shown in FIG. 6, the core 31c for the specific purpose of making it possible to mold a type or form of bushing as shown in FIGS. 1, 2, 1a and 1b; comprises a body section 31c′ whose outside surface 43′ is cylindrical about the longitudinal axis C of the core, and a core portion 10aa extending from the upper end of body section 31c′, the outside surface 43 being substantially cylindrical about axis C on a radius less than that of the outside surface 43′ and slightly tapered in the direction outwardly with respect to body section 31c′. For the purpose of forming the outside surface of the arcuate bushing head 11 at the juncture thereof with the top end of body portion 10 as viewed in FIG. 2, the formation or structural configuration is such that with regard to any plane through axis C, the intersection of such plane with the outside surface 43 of core portion 10aa is, at the base of the core portion, an arc r′ embracing ninety degrees.

FIG. 4a shows more clearly the structural features of the first mold part $M_1$ comprising cavity part 31 and core 31c which may be integral or non-integral with respect to cavity part 31. The core portion 10aa extends outwardly of cavity part 31 and substantially beyond the work face thereof and is spaced from cavity part 31 in the region of the latter at each of the projections 34a, 34b and 34c and over a longitudinal extent substantially greater than the longitudinal extent d of these projections. Each of the concave edge portions 33a, 33b and 33c has the arcuate cross-sectional configuration on the radius R′ substantially greater than the approximate radius or arc r′. The arcs R′ and r′ meet or join at the point r′R′ on the inside cylindrical surface 31′ of cavity part 31, as shown. For the purpose of causing each of the notches 18, 19 and 20 to be made through the edge portion 12 of the bushing head 11, the dimensions d of the projections 34a, 34b and 34c and of the slots 36a, 36b and 36c each considered in the direction longitudinally of the mold, are the same. In other words, the height of each of the projections 34a, 34b and 34c is equal to the depth of the related slots 36a, 36b and 36c.

In the use of our improved injection mold as disclosed and claimed herein, the speed of the production cycle can be relatively high. Also, the simplicity and ruggedness of construction of the mold give to the same a relatively long life considering the extreme working temperatures, the relatively high mold or clamping pressure, and the relatively high molding or injection pressure.

We claim as our invention:

1. In a mold of the character described for molding a self-locking bushing of the character described herein as comprising a non-split and relatively flexible body portion provided at one end thereof with a relatively flexible head having in and through its edge portion at least one notch and also provided with a locking step protruding radially outwardly from the outside surface of said body portion and aligned with said notch in the direction longitudinally of said body portion; first and second mold parts having respective work faces complementary with respect to each other in the sense that with said mold parts closed against each other during normal operation of said mold there is provided between said faces the required mold cavity for said bushing, said mold parts when so closed having a common longitudinal axis, said first mold part having an inside substantially cylindrical surface disposed substantially concentric with respect to said axis and having a similarly disposed concave edge portion and being provided at an end of said concave edge portion with a projection extending from said inside cylindrical surface substantially radially outwardly with respect to said axis, said second mold part having an inside substantially cylindrical surface disposed substantially concentric with respect to said axis, the work face of said second mold part being provided with a protrusion complementary with respect to said concave edge portion and of convex cross-sectional configuration and disposed substantially concentric with respect to said axis, the work face of said second mold part also being provided with a slot shaped and disposed to receive said projection during the closing action of said mold, said second mold part being provided in said inside substantially cylindrical surface thereof with a groove aligned with and joining said slot thus to provide that part of said mold cavity for the forming of said locking step, the respective dimensions of said projection and of said slot each considered in the direction longitudinally of said mold being substantially the same thus to cause said notch to be made through said edge portion of the bushing head, as aforesaid.

2. A cavity part for a mold of the character described for molding a self-locking bushing of the character described herein as comprising a non-split and relatively flexible body portion provided at one end thereof with a relatively flexible head having in and through its edge portion at least one notch; said cavity part having a longitudinal axis, said cavity part disposed substantially concentric with respect to said axis and having a similarly disposed concave edge portion and having an inside substantially cylindrical surface being provided at an end of said concave edge portion with a projection extending from said inside cylindrical surface substantially radially outwardly with respect to said axis, the dimension of said projection considered in the direction longitudinally of said cavity part being at least that of the required thickness of said bushing head at said edge portion of the latter thus in the use of said cavity part to result in said head having in and through its edge portion at least one notch, as aforesaid.

3. A cavity part for a mold of the character described; said cavity part having a longitudinal axis and a work face substantially perpendicular to said axis, said cavity part at said work face thereof having an inside substantially cylindrical surface substantially concentric with respect to said axis, said cavity part being provided in said work face thereof with a slot extending from said inside cylindrical surface substantially radially outwardly with respect to said axis.

4. In a mold of the character described for molding a self-locking bushing of the character described herein as comprising a non-split and relatively flexible body portion provided at one end thereof with a relatively flexible head having in and through its edge portion at least one notch, said body portion being provided on its outside surface with a longitudinally-extending and tapered rib aligned with said notch and stepped to provide a locking surface for said bushing; first and second mold parts having respective work faces complementary with respect to each other in the sense that with said mold parts closed against each other during normal operation of said mold there is provided between said faces the required mold cavity for said bushing, said mold parts when so closed having a common longitudinal axis, said first mold part having an inside substantially cylindrical surface disposed substantially concentric with respect to said axis and having a similarly disposed concave edge portion and being provided at an end of said concave edge portion with a projection extending from said inside cylindrical surface substantially radially outwardly with respect to said axis, said second mold part having an inside substantially cylindrical surface disposed substantially concentric with respect to said axis, the work face of said second mold part being provided with a protrusion complementary with respect to said concave edge portion and of convex cross-sectional configuration and disposed substantially concentric with respect to said axis, the work face of said second mold part also being provided with a slot shaped and disposed to receive said projection during the closing action of said mold, said second mold part being provided in said inside substantially cylindrical surface thereof with a longitudinally-disposed groove aligned with and joining said slot and the depth of which is tapered along a substantial length of the same thus to provide that part of said mold cavity for the forming of said longitudinally-extending and tapered rib, the respective dimensions of said projection and of said slot each considered in the direction longitudinally of said mold being substantially the same thus to cause said notch to be made through said edge portion of the bushing head, as aforesaid.

5. A mold part for a mold of the character described; said mold part having a longitudinal axis and including a cavity part having a work face perpendicular to said axis and an inside substantially cylindrical surface disposed substantially concentric with respect to said axis, said work face being provided with a projection extending from said inside cylindrical surface substantially radially outwardly with respect to said axis, said mold part including a core portion extending outwardly of said cavity part and substantially beyond said work face and spaced from said cavity part in the region of the latter at said projection and over a longitudinal extent substantially greater than the longitudinal extent of said projection, intersections of the outside surface of said core portion with planes through said axis each being an arc in the region of said substantially cylindrical surface longitudinally inward of said projection.

6. A mold part for a mold of the character described; said mold part having a longitudinal axis and including a cavity part having a work face perpendicular to said axis and an inside substantially cylindrical surface disposed substantially concentric with respect to said axis, said work face being provided with a projection extending from said inside cylindrical surface substantially radially outwardly with respect to said axis, said mold part including a core portion extending outwardly of said cavity part and substantially beyond said work face and spaced from said cavity part in the region of the latter at said projection and over a longitudinal extent substantially greater than the longitudinal extent of said projection, intersections of the outside surface of said core portion with planes through said axis each being an arc in the region of said substantially cylindrical surface longitudinally inward of said projection, said work face having concave edge portions disposed circumferentially about said axis from the respective opposite sides of said projection, said edge portions having an arcuate cross-sectional configuration on a radius substantially greater than the approximate radius of said arc.

7. A cavity part for a mold of the character described for molding a self-locking bushing of the character described herein as comprising a non-split and relatively flexible body portion provided at one end thereof with a relatively flexible arcuate head having in and through its edge portion at least one notch; said cavity part having a longitudinal axis, said cavity part having an inside substantially cylindrical surface disposed substantially concentric with respect to said axis, said cavity part being provided with a projection extending from said inside cylindrical surface substantially radially outwardly with respect to said axis said cavity part being provided with concave edge portions disposed circumferentially about said axis and extending respectively from the adjacent opposite sides of said projection, the dimension of said projection considered in the direction longitudinally of said cavity part being at least that of the required thickness of said bushing head at said edge portion of the latter thus in the use of said cavity part to result in said head having in and through its edge portion at least one notch, as aforesaid.

8. A cavity part for a mold of the character described for molding a self-locking bushing of the character described herein as comprising a non-split and relatively flexible body portion provided at one end thereof with a relatively flexible arcuate head having in and through its edge portion three notches each spaced substantially one hundred twenty degrees from the notch to either side of the same; said cavity part having a longitudinal axis, said cavity part having an inside substantially cylindrical surface, disposed substantially concentric with respect to said axis, said cavity part being provided with three projections each extending from said inside cylindrical surface substantially radially outwardly with respect to said axis, said cavity part being provided with three concave edge portions each disposed circumferentially about said axis and each being in circumferential extent the same as the circumferential distance between the respective adjacent sides of the projections at opposite ends of the concave edge portion, the dimension of each of said projections considered in the direction longitudinally of said cavity part being at least that of the required thickness of said bushing head at said edge portion of the latter thus in the use of said cavity part to result in said head having in and through its edge portion three notches, as aforesaid.

9. A cavity part for a mold of the character described; said cavity part having a longitudinal axis and a work face substantially perpendicular to said axis, said cavity part at said work face thereof having an inside cylindrical surface substantially concentric with respect to said axis said cavity part being provided in said work face thereof with three slots each extending from said inside cylindrical surface substantially radially outwardly with respect to said axis and each spaced substantially one hundred twenty degrees from the slot to either side of the same, said cavity part in said substantially cylindrical surface thereof being provided with three longitudinally-disposed grooves aligned with and joining respectively said slots, the depth of each of said grooves being tapered along a substantial length of the same.

10. A cavity part for a mold of the character described; said cavity part having a longitudinal axis and a work face a substantial part of which is disposed in a plane substantially perpendicular to said axis, said cavity part having an inside substantially cylindrical surface substantially concentric with respect to said axis, said cavity part being provided with three projections each extending from said inside cylindrical surface substantially radially outwardly with respect to said axis and each spaced substantially one hundred twenty degrees from the projection to either side of the same, said cavity part being provided with three concave edge portions each disposed circumferentially about said axis and between two of said projections, each of said concave edge portions being in circumferential extent the same as the circumferential distance between the respective adjacent sides of the projections at opposite ends of the concave edge portion, each of said projections in the direction longitudinally of said cavity part extending beyond said work face and said plane thereof.

11. A cavity part for a mold of the character described; said cavity part having a longitudinal axis and a work face substantially perpendicular to said axis, said cavity part at said work face thereof having an inside substantially cylindrical surface substantially concentric with respect to said axis, at least a substantial circumferential extent of said work face about said axis being convex through substantially one hundred eighty degrees and having a substantially uniform cross-sectional configuration on a given arc through substantially ninety degrees from said cylindrical surface and on an arc substantially greater than said first-named arc through substantially the other ninety degrees of said configuration.

References Cited in the file of this patent
UNITED STATES PATENTS

| | | |
|---|---|---|
| 2,624,071 | Strahm et al. | Jan. 6, 1953 |
| 2,891,283 | Cramer et al. | June 23, 1959 |

FOREIGN PATENTS

| | | |
|---|---|---|
| 490,273 | Great Britain | Aug. 11, 1938 |

UNITED STATES PATENT OFFICE
CERTIFICATE OF CORRECTION

Patent No. 3,099,046                                      July 30, 1963

Ferdinand Klumpp, Jr., et al.

It is hereby certified that error appears in the above numbered patent requiring correction and that the said Letters Patent should read as corrected below.

In the drawings, Sheet 3, Fig. 8, for "24" read -- 24' --; column 4, lines 50 and 51, for "engages" read -- engage --; column 5, line 11, for "left-" read -- left, --; line 62, for "other," read -- other --; line 63, after "bushing" insert a comma; column 6, line 9, for "step" read -- steps --; line 61, for "1" read -- 14 --; column 8, lines 49 and 58, for "workface", each occurrence, read -- work face --; column 9, line 15, for "eight" read -- eighty --; lines 42, 44, 45 and 54, for "workface", each occurrence, read -- work face --; same column 9, line 62, for "workfaces" read -- work faces --; column 11, lines 47 and 48, strike out "having an inside substantially cylindrical surface" and insert the same after "part" in line 45, same column 11; column 13, line 8, after "axis" insert a comma; line 45, after "inside" insert -- substantially --; line 46, after "axis" insert a comma.

Signed and sealed this 12th day of May 1964.

(SEAL)
Attest:

ERNEST W. SWIDER
Attesting Officer

EDWARD J. BRENNER
Commissioner of Patents